United States Patent [19]

Konishi et al.

[11] Patent Number: 4,641,271

[45] Date of Patent: Feb. 3, 1987

[54] PILING PLANNING METHOD AND PILING SYSTEM OF CARGOES BY PALLETIZING ROBOT

[75] Inventors: Yozo Konishi, Yokohama; Kichizo Akashi, Ebina; Hideo Watase, Tsuchiura; Tatsuo Yoshioka, Ichikawa, all of Japan

[73] Assignee: Hitachi, Ltd., Tokyo, Japan

[21] Appl. No.: 668,962

[22] Filed: Nov. 7, 1984

[30] Foreign Application Priority Data

Nov. 9, 1983 [JP] Japan ................................. 58-209057
Jul. 19, 1984 [JP] Japan ................................. 59-150058

[51] Int. Cl.⁴ ............................................. G06F 15/20
[52] U.S. Cl. .................................... 364/478; 364/513; 414/273; 901/7
[58] Field of Search ... 364/478, 468, 513, 200 MS File, 364/900 MS File; 414/273, 275, 286, 902, 110, 134–136; 235/375, 385; 901/3, 6, 7

[56] References Cited

U.S. PATENT DOCUMENTS

| | | | |
|---|---|---|---|
| 3,927,773 | 12/1975 | Bright ................................. | 414/273 |
| 4,088,237 | 5/1978 | Brown .............................. | 414/270 X |
| 4,203,695 | 5/1980 | Wynn et al. ..................... | 414/902 X |
| 4,275,986 | 6/1981 | Engelberger et al. ............. | 901/3 X |

OTHER PUBLICATIONS

Gold et al–"A Microcomputer Controlled Case Palletizer"–IAS Annual Meeting–1980, Cincinnati, OH–pp. 367-371.

*Primary Examiner*—Joseph Ruggiero
*Attorney, Agent, or Firm*—Antonelli, Terry & Wands

[57] ABSTRACT

A piling planning method for cargoes in which an operator can designate a piling position of each of the various cargoes, and by displaying the piling result graphically on a graphic terminal, a piling patern is determined so that vacant space is reduced, and by using a final piling pattern, a piling position and a piling order of each cargo, and a piling operation sequence of the palletizing robot are determined. A piling system is provided in which cargoes supplied thereto are piled on a pallet in accordance with piling planning data prepared by a piling planning device which executes the above piling planning method.

4 Claims, 27 Drawing Figures

| | | 3 |
|---|---|---|
| 1 | 2 | 6 |
| 4 | 5 | 9 |
| 7 | 8 | 10 |

FIG. 6

| PALLET CODE | PALLET EFFECTIVE MOUNTING SPACE | | | CONTROL WEIGHT |
|---|---|---|---|---|
| | LENGTH | WIDTH | HEIGHT | |
| PA | 2,250 | 1,820 | 1,700 | 1,500 |
| PB | 2,250 | 1,520 | 1,700 | 1,500 |
| PC | 1,125 | 1,820 | 1,700 | 1,500 |

FIG. 7

| CARGO CODE | CARGO SPECIFICATION | | | | PILING REQUIRED QUANTITY |
|---|---|---|---|---|---|
| | LONGER | SHORTER | HEIGHT | WEIGHT | |
| S01 | 800 | 600 | 450 | 15 | 20 |
| S02 | 650 | 500 | 400 | 12 | 5 |
| S03 | 500 | 300 | 375 | 8 | 8 |
| S04 | 1,050 | 250 | 175 | 27 | 1 |

FIG. 8

| PATTERN NAME | PILING NUMBER | CARGO CODE | PILING POSITION | | | PILING DIRECTION |
|---|---|---|---|---|---|---|
| | | | X | Y | Z | |
| A | 1 | S01 | 0 | 0 | 0 | L |
| A | 2 | S01 | 800 | 0 | 0 | L |
| A | 3 | S02 | 1,600 | 0 | 0 | L |
| A | 4 | S01 | 0 | 600 | 0 | L |

FIG. 9

| PATTERN NAME | PILING ORDER | PILING NUMBER | CARGO CODE |
|---|---|---|---|
| A | 1 | 7 | S01 |
| A | 2 | 8 | S01 |
| A | 3 | 10 | S03 |
| A | 4 | 4 | S01 |

FIG. 10

| PATTERN NAME | PILING ORDER | OPERATION POINT NUMBER | OPERATION POINT POSITION | | | SPEED | INTERPOLATION FORM | OPERATION COUNTER | TIMER |
|---|---|---|---|---|---|---|---|---|---|
| | | | x | y | z | | | | |
| A | 1 | 1 | -800 | 0 | 400 | 0 | 1 | 1 | 10 |
| A | 1 | 2 | -800 | 0 | 800 | 10 | 1 | 1 | 1 |
| A | 1 | 3 | -600 | 0 | 1050 | 10 | 1 | 1 | 1 |
| A | 1 | 4 | 1500 | 0 | 1050 | 10 | 1 | 1 | 1 |

FIG. 16

| WORK ORDER | PATTERN NAME | WORK STATUS |
|---|---|---|
| 1 | A | 1 |
| 2 | A | 0 |
| 3 | B | 0 |
| 4 | D | 0 |

FIG. 17

| PILING ORDER | PILING NUMBER | CARGO CODE | PILING STATUS |
|---|---|---|---|
| 1 | 7 | S01 | 1 |
| 2 | 8 | S01 | 0 |
| 3 | 10 | S03 | 0 |
| 4 | 4 | S01 | 0 |

FIG. 18

| PILING ORDER | OPERATION POINT NUMBER | OPERATION POINT POSITION | | | SPEED | INTERPO- LATION FORM | OPERATION CONTENT | TIMER | OPERATION STATUS |
|---|---|---|---|---|---|---|---|---|---|
| | | x | y | z | | | | | |
| 1 | 1 | -800 | 0 | 400 | 0 | 1 | 1 | 10 | 1 |
| 1 | 2 | -800 | 0 | 800 | 10 | 1 | 1 | 1 | 1 |
| 1 | 3 | -600 | 0 | 1050 | 10 | 1 | 1 | 1 | 1 |
| 1 | 4 | 1500 | 0 | 1050 | 10 | 1 | 1 | 1 | 1 |

FIG. 19

| RACK NUMBER | CARGO CODE | STOCK STATUS |
|---|---|---|
| T01 | S02 | 0 |
| T02 | S01 | 1 |
| T03 | S01 | 0 |
| T04 | S03 | 0 |

FIG. 20

| SUPPLY ORDER | CARGO CODE | SUPPLY STATUS |
|---|---|---|
| 1 | S01 | -1 |
| 2 | S01 | 9 |
| 3 | S03 | 1 |
| 4 | S01 | 1 |

PILING PLANNING METHOD AND PILING SYSTEM OF CARGOES BY PALLETIZING ROBOT

BACKGROUND OF THE INVENTION

The present invention relates to a method of establishing a piling plan for determining information required to automatically pile the cargoes requested to be transported onto a transporting jig such as pallet, container, etc., (hereinafter referred to as a pallet), by means of a palletizing robot, that is, for determining that piling disposition which will efficiently pile the cargoes, a piling order for each cargo and an operation sequence of the robot are established. The present invention further relates to a piling system for automatically piling the cargoes on the pallet based on the established plan.

As a device for automatically piling cargoes on a pallet, there are auto-palletizers and palletizing robots (called robot palletizers). These devices are only capable of piling cargoes having the same size on one pallet. As a result, if the number of kinds of cargoes to be piled on one pallet increases due to the progress of transportation of cargoes of many kinds but small quantity, it will be impossible to pile by means of the conventional palletizing robot.

In case of piling automatically the cargoes of various different sizes on one pallet by means of automatic piling device such as a palletizing robot (hereinafter referred to simply as a robot), the following problems arise:

(1) In case of selecting a cargo piling disposition manually, due to a large increase in the number of combinations of piling dispositions, the mounting efficiency with respect to the effective mounting space on the pallet tends to be reduced. For this reason, there is a requirement for a method of establishing the piling disposition of cargoes, which method is capable of realizing high mounting efficiency even when the cargoes are of different sizes (hereinafter the established piling disposition is referred to as a piling pattern).

(2) In order to pile each cargo by means of the robot, it is necessary to teach the robot an operation for each cargo. Since the content of this operation differs for each cargo, the man-hours for the teaching increases in the conventional operation teaching method of the playback type. Therefore, there is a requirement for a method of automatically deciding, simultaneously with the establishment of the aforementioned piling pattern, an order of cargoes to be piled and a sequence of robot operations, which are used as operation teaching data for the robot.

(3) In order to supply the cargoes to the robot in the aforementioned piling order, it is necessary to search for cargoes of the designated kind among the various kinds of cargoes and to send them to the piling device. In particular, when various kinds of cargoes are to be piled on one pallet, if the search and supply of the cargoes are performed manually, the man-hours will be increased and the speed of supply will be lowered. For this reason, a marshalling method is necessary to supply the cargoes to the piling device in conformity with the above piling order.

SUMMARY OF THE INVENTION

A first object of the present invention is to provide a piling planning method which is capable of determining in a short time and with a simple manipulation, the piling pattern which realizes a high mounting efficiency of cargoes in a limited effective mounting space on a pallet when the transportation of the cargoes by the pallet is requested, and at the same time, is capable of deciding automatically a cargo piling order and a robot operation sequence based on the above piling pattern for the purpose of reducing the man-hours required to teach the robot the operations thereof.

Further, a second object of the present invention is to provide an automatic piling system which solves each of the aforementioned problems, and provides a piling disposition and a piling order with higher mounting efficiency on a pallet for cargoes of different sizes and for an arbitrary cargo piling request, and which is capable of reducing the man-hours for teaching the operation sequence and reducing the man-hours required from the arrival to the supply of the cargoes.

In order to achieve the first object, the piling planning method according to the present invention is featured in providing the following two functions:

(1) In order to pile various kinds of cargoes on a pallet by utilizing, without a waste of space, the effective mounting space determined depending on the type of the pallet, in the present invention, a piling position of each cargo is designated by an operator within the above effective mounting space depending on the kind, shape and quantity of the cargoes, and based on the result of this designation, a computer displays the disposition condition of the piled cargoes on a graphic terminal graphically to facilitate the recognition of vacant space. These procedures are repeated, and a piling pattern for each cargo is determined one after the other through communication between the computer and the operator.

(2) By using data of the above final piling pattern, a piling order for each cargo is determined in accordance with a predetermined rule.

Further, once the final piling disposition and the piling order for each cargo have been determined, for any cargo, before that cargo is piled, it is possible to know the disposition conditions of the cargoes (already piled cargoes) which have already been piled. Therefore, for each cargo, an operation route and speed which avoid contact of that cargo with the already piled cargoes can be selected. In this manner, the operation sequence of the robot is determined.

Furthermore, in order to achieve the second object, the piling system according to the present invention is featured by comprising piling planning means for preparing a piling disposition of a cargo on a transporting jig, a piling order and an operation sequence of piling means based on given sizes of a plurality of cargoes to be transported, control means receiving data from the piling planning means for controlling each means in the system in accordance with the data, marshalling means, receiving the cargoes in an arbitrary order, for sending the cargoes in accordance with the piling order from the control means, supply means for supplying the cargoes sent from the marshalling means to a position of the transporting jig, and piling means for piling the supplied cargoes on the transporting jig in accordance with the operation sequence.

BRIEF DESCRIPTION OF THE DRAWINGS

FIGS. 6 to 10 are tables showing examples of storing forms of various data stored respectively in memory sections, in the method according to the present invention.

FIGS. 16 to 20 are tables of various data stored in memory sections of the control device in FIG. 15.

DESCRIPTION OF THE PREFERRED EMBODIMENTS

First, a first embodiment of the present invention will be described in detail with reference to the drawings.

Figure 1A:
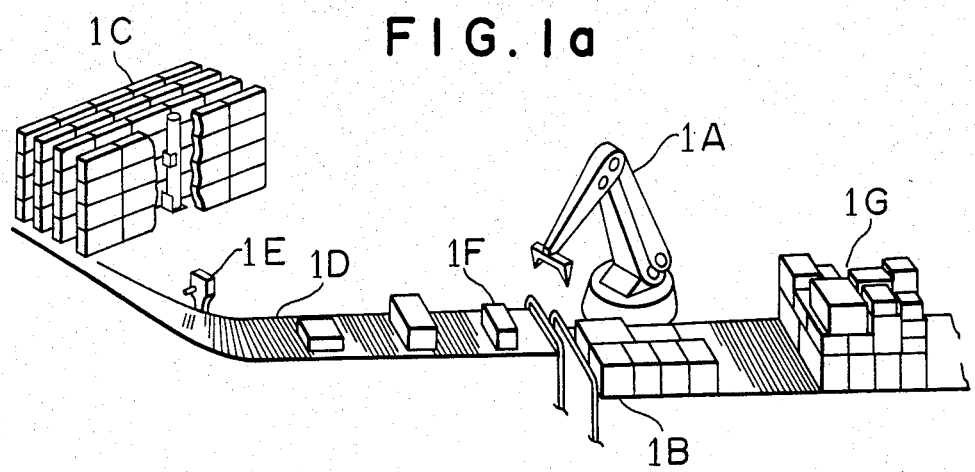
FIG. 1a is a schematic diagram of a piling installation useful to explain the background of a method according to the present invention.

FIG. 1a is a schematic diagram of a palletizing robot and its associated facilities which constitute the background of a piling planning method which achieves the first object of the present invention. Reference numeral 1A designates a robot, 1B a pallet, 1C a device for automatically taking out a designated cargo as is the case in an automatic warehouse, 1D a supply conveyor for cargoes, 1E an identifying device of cargoes, 1F a cargo, and 1G a pallet on which cargoes have been piled. Cargoes are placed on the supply line 1D from the automatic warehouse in accordance with a predetermined piling order. On the other hand, in accordance with a predetermined operation sequence, the palletizing robot 1A piles each cargo 1F one after the other on the pallet 1B.

The method according to the present invention decides these cargo piling position, cargo piling order and robot operation sequence.

Figures 2, 3:
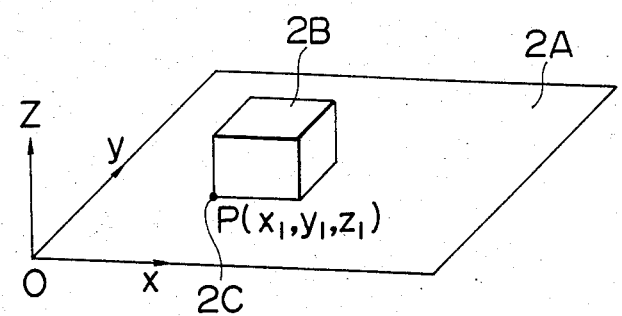
FIG. 2 is a diagram showing a positional definition of a cargo on a pallet.
FIG. 3 is a diagram showing an example of a selected piling order.

FIG. 2 shows a positional definition of a cargo 2B on a pallet 2A. For example, a piling position of a cargo is designated by setting rectangular coordinates having the origin at the left end on the side of the robot. More specifically, the coordinates of a point 2C which is the nearest on the cargo to the origin are defined as a piling position of the cargo 2B. Further, a piling direction of the cargo is determined depending on which of a longer direction (displayed with a symbol L) or a shorter direction (displayed with a symbol S) of the cargo 2B is in the X axis direction.

FIG. 3 shows an example of a display of a piling order of each cargo in a plan view. In this example, cargoes are piled according to a priority rule in which, as a rule, the cargoes are disposed, as viewed from he robot side, (i) from below to upper, (ii) from back to forward, and (iii) from left end to right end.

Figure 4:
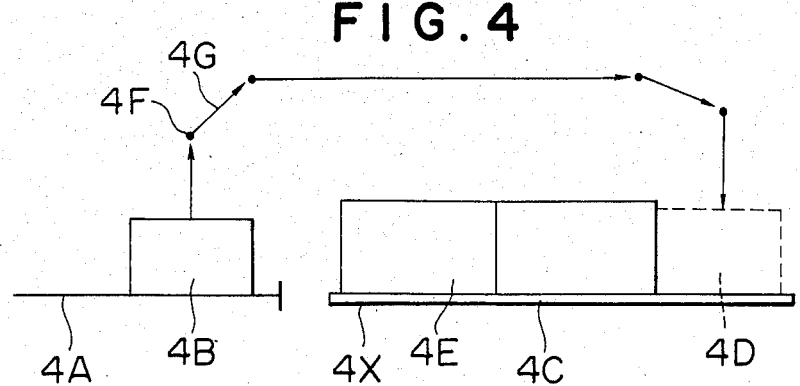
FIG. 4 is a diagram showing an example of an operation sequence.

FIG. 4 shows an example of an operation route of the robot in piling a cargo 4B supplied on a supply conveyor 4A to a position 4D over and across already piled cargoes 4E and 4C. The numeral 4F designates an operation point, and 4G is an example of the operation route. If each piling position of such already piled cargoes has been known, an optimum route can be determined to pass through the previously piled cargoes by keeping away from these cargoes which form obstacles along the path. Thus, if the position of the already piled cargo is given as expressed in the coordinate system as in FIG. 2, an operation sequence of the robot can be determined.

Figure 5A:
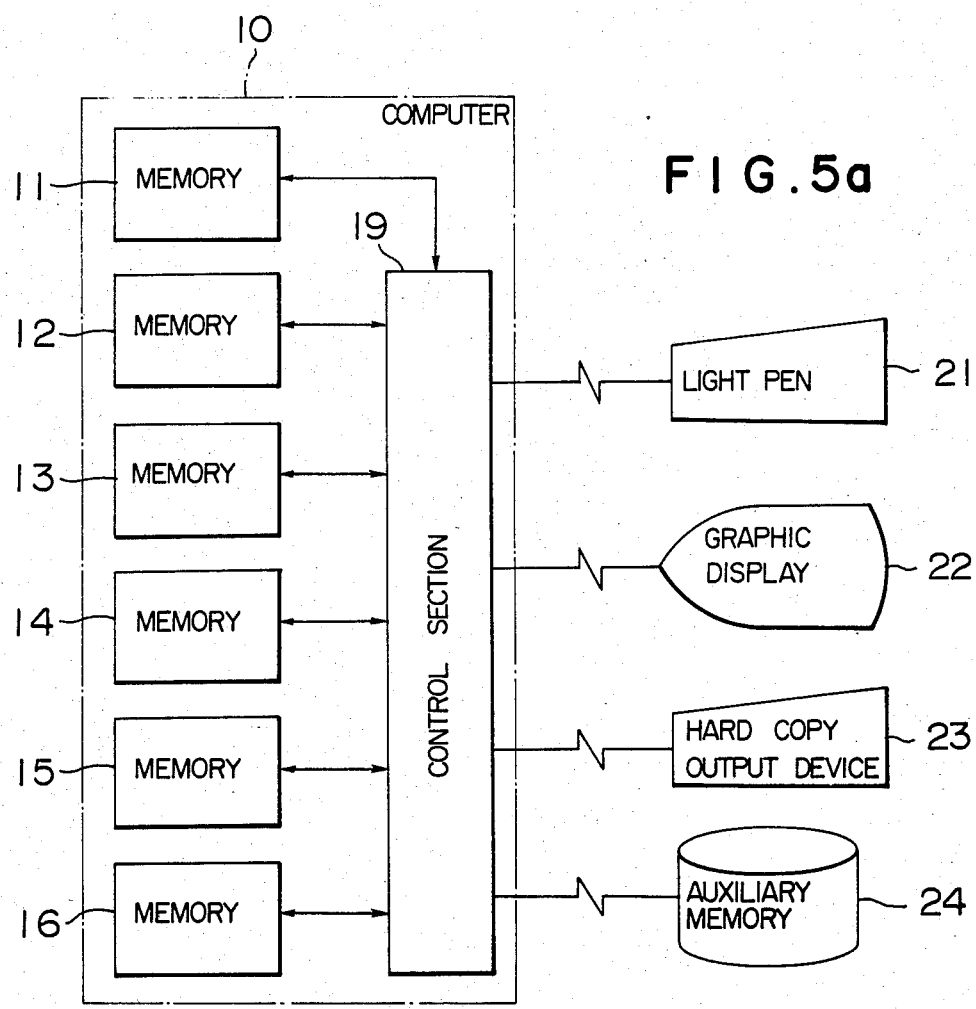
FIG. 5a is a block diagram showing an overall arrangement of a system which realizes a piling method according to the present invention.

FIG. 5a is a block diagram which schematically shows the overall arrangement of a system for realizing the piling planning method according to the present invention, in which the reference numeral 10 designates a computer, 21 a light pen for inputting data, 22 a graphic display unit, 23 a hard copy output device, and 24 designates an auxiliary memory unit.

The computer 10 is comprised of a control section 19 which operates in accordance with a program stored in a memory section 11, and is comprised of five data memory sections 12 to 16. In the memory section 12, for instance, as shown in FIG. 6, specification data for each type of pallet which has been registered beforehand is expressed in the form of a table and then stored. Further, in the memory section 13, for example as shown in FIG. 7, specification data for each cargo which has been registered beforehand and the required piling quantity are stated in a table. In the memory section 14, there are stored cargo piling positions and piling directions which are inputted from the light pen 21 by the operator. In the memory sections 15 and 16, a cargo piling order and a robot operation sequence which are calculated by the computer from the contents of the memory sections 12 to 14 are respectively stored.

The operator who utilizes the method of the present invention, determines beforehand a type of pallet suitable for the required quantity from a given chit requesting piling of cargoes, and establishes a general piling policy for each cargo with respect to this pallet. The operator, first designates the type of pallet on which the cargoes are to be piled, and then designates a cargo code, piling position and piling direction of the cargo to be piled at first. This designation is performed through the light pen 21. The computer 10 sets this input information in the memory section 14. In this instance, in the memory section 14, for example in the form of FIG. 8, the data showing the coordinates (X axis, Y axis and Z axis) of the piling position of the cargo and the piling direction (longer direction L and shorter direction S) are set.

Next, the computer 10 displays in the form of a plan view on the display unit 22, a piling disposition condition of the cargoes which have already been piled. The operator viewing the picture displayed on the display unit 22 looks for vacant piling space, and determines whether to further pile or not. In this case, the piling is continued, the above procedures are repeated, and the cargoes are piled one after the other in the effective piling space on the pallet.

The operator, after repeating the above procedures, determines that the piling is completed finally, and the computer 10 decides a piling order of each cargo on the basis of the information of the piling positions set within the memory section 14, and sets the piling order in the memory section 15. In this case, in the memory section 15, for example in the form of FIG. 9, data indicating the piling order and the cargo code for each cargo placed in this form in an earlier piling order is set. Further, the computer 10 determines a robot operation sequence for each piling order based on the information set in the memory sections 12 to 15, and sets the robot operation sequence in the memory section 16. In this case, in the memory section 16, for example in the form of FIG. 10, data indicating the operation sequence for each piling order is set.

Figure 11:
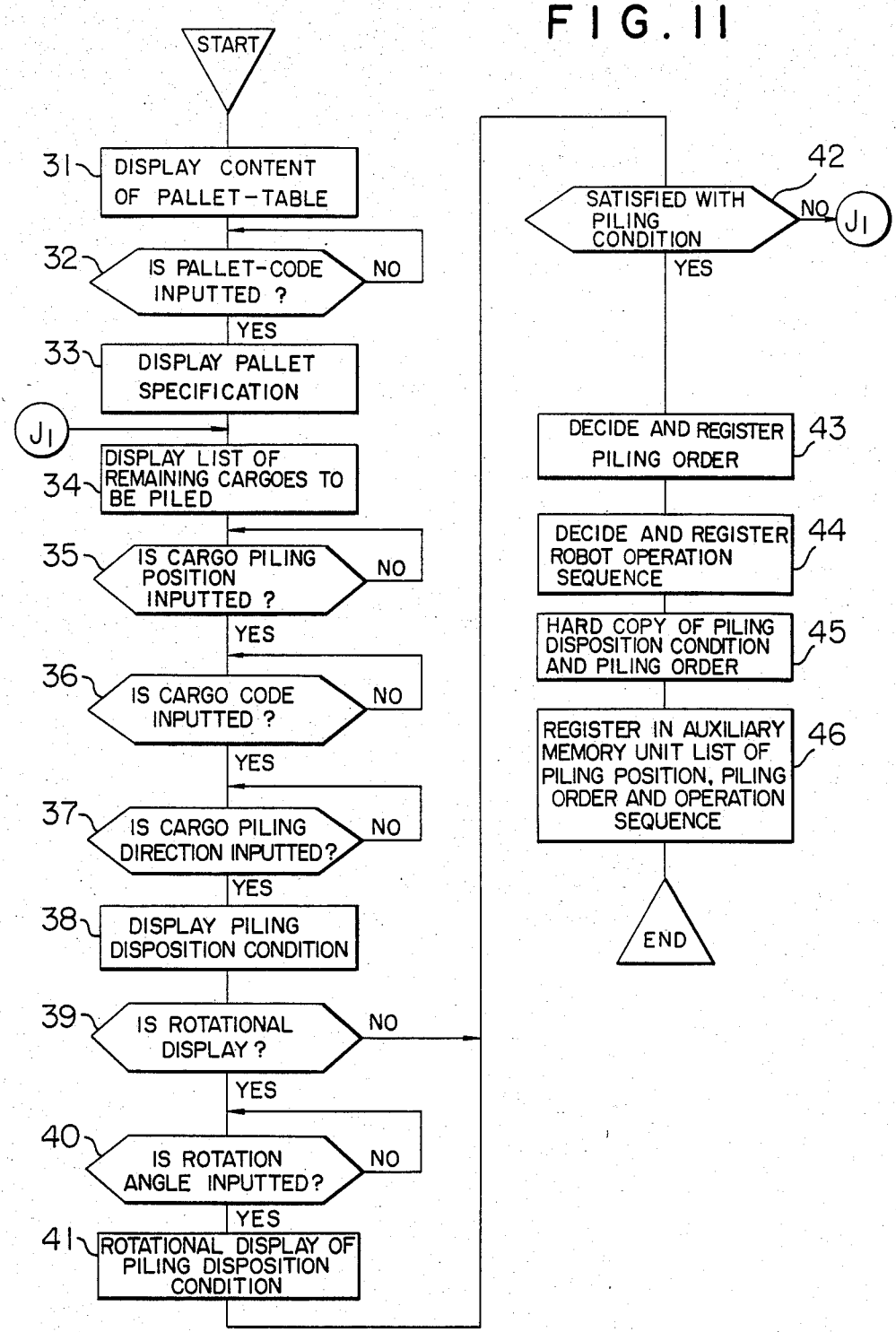
FIG. 11 is a flowchart for controlling in the method of the present invention.

FIG. 11 is a rough flowchart of a program stored in the memory section 11 to perform the aforementioned control operation.

With reference to operation steps 31 to 46 of the flowchart, concrete operations in the method of the present invention will be described in detail hereinafter.

Step 31: In response to an actuation input from the light pen 21, the content of the pallet-table of FIG. 6, that is, a list of the pallet codes and pallet specifications is displayed on the display unit 22.

Step 32: The computer 10 waits for an input of the pallet-code from the light pen 21. The operator, viewing the content of the display on the display unit 22, selects a suitable pallet, and after inputting the pallet-code from the light pen 21 proceeds to the next step.

Step 33: Based on the pallet-code inputted from the light pen 21, specification data corresponding to the pallet is searched out from the memory section 12, and the specification data is displayed on the display unit 22.

Step 34: The computer searches out the specification data corresponding to the pallet from the memory section 12, and also searches out piling data of the already piled cargoes from the memory section 14, and displays on the display unit 22, for example in the form of FIG. 12 at A, the specification data of the designated pallet and a plan view of the cargoes piled in the effective piling space on the pallet. Further, on the same display screen, after searching out the piling remaining quantity from the memory section 13, a list of remaining cargoes to be piled is displayed, for example in the form of FIG. 12 at B, on the display unit 22. Further, on the same display screen, a selection menu of the piling direction is displayed, for example in the form of FIG. 12 at C.

Figure 12:
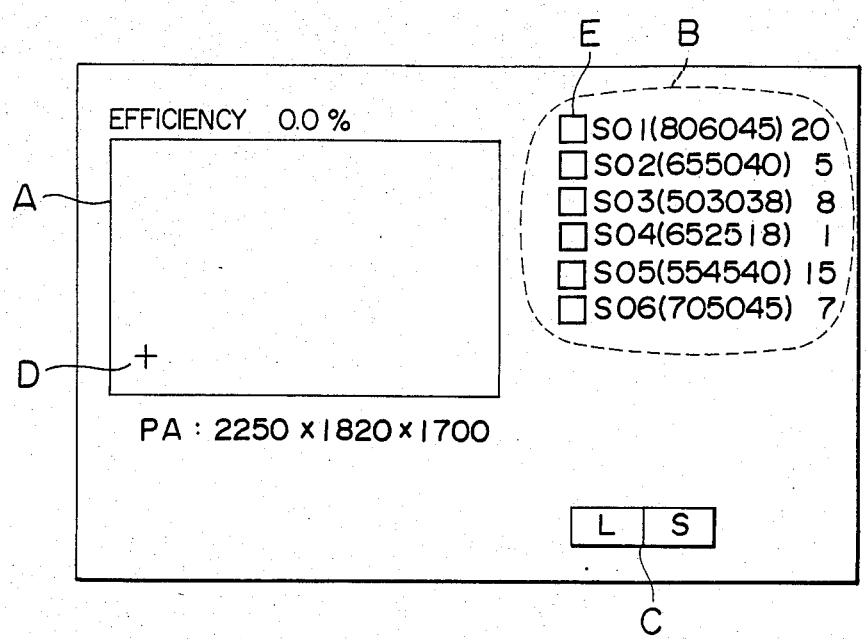
FIGS. 12 to 14 show respectively examples of pictures on a display screen.

Step 35: The computer waits for an input of the cargo piling position. The operator presumes a position considered to be suitable, and inputs the coordinates of the position, for example as shown in FIG. 12 at D with the light pen. After completion of the input, the sequence proceeds to the next step 36.

Step 36: The computer waits for an input of the cargo code. The operator presumes a cargo code considered to be suitable, and designates that cargo, for example as shown in FIG. 12 at E with the light pen. In the example of FIG. 12, a cargo code S01 is selected. After completion of the input, it proceeds to the next step 37.

Step 37: The computer waits for an input of the cargo piling direction. The operator presumes a piling direction (L or S) considered to be suitable, and designates L or S in the selection menu of the piling direction as shown, for example in FIG. 12 at C, with the light pen. In other words, as to the piling direction, if the longer direction of the cargo is desired to be in the direction of the X axis direction, L is designated, whereas if the shorter direction of the cargo is desired to be in the X axis direction, then S is designated. After completion of the input, it proceeds to the next step 38.

Figure 13:
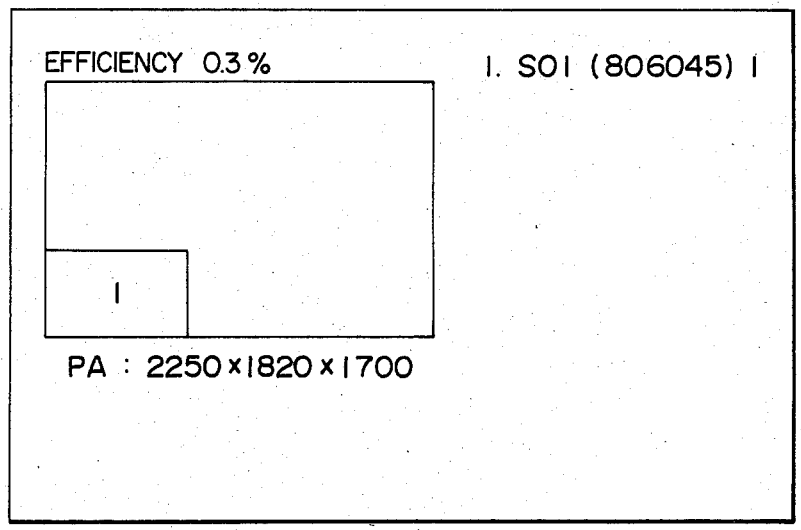

Step 38: The computer sets the inputted cargo piling position, cargo code and cargo piling direction in a predetermined column of the table in FIG. 8, which table has been prepared and indicates a cargo piling condition. Next, the computer, based on the information set in the memory sections 12 to 14, displays on the display unit 22 a diagram of a piling disposition condition on th pallet, for example in the form shown in FIG. 13. Further, the computer calculates mounting efficiency of the cargoes piled accumulatively, and displays it on the same display screen. Then it proceeds to step 39.

Step 39: The computer waits for an input indicating whether to display the already piled cargoes in a rotated position or not. As the number of the already piled cargoes increases, since there are many cargoes of different heights, in frequent times it is difficult for the operator to recognize a piling position for the next piling, that is, vacant space from the diagram displaying the piling disposition condition, for example in the plan view as in FIG. 13. In such a case, the operator may request the rotational display to the computer. When the operator designates the rotational display, it proceeds to step 40, and if it is not, it proceeds to step 42.

Step 40: The computer waits for an input of a rotation angle. The operator presumes a suitable rotation angle, and selects and designates a suitable angle in a rotation angle menu displayed on the display unit 22. After completion of the input, it proceeds to the next step 41.

Figure 14:
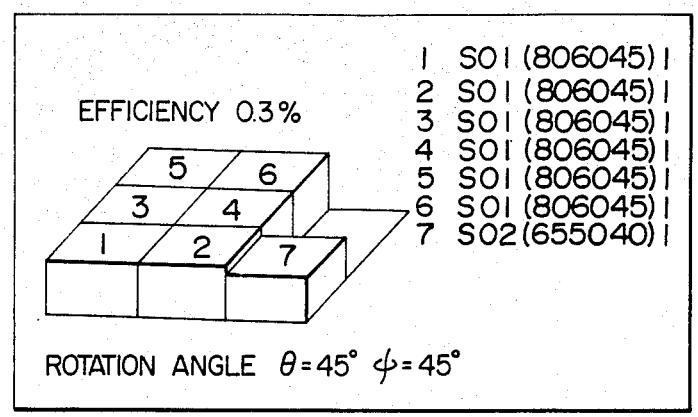

Step 41: The computer, based on the information inputted in the step 40, displays on the display unit 22 a piling disposition condition diagram of the already piled cargoes viewed from the designated angle, for example in the form shown in FIG. 14. Then it proceeds to step 42.

Step 42: The computer waits for an input of information relating to whether or not the above piling disposition condition is satisfactory. The operator viewing the display screen, inputs reply information as to whether or not he is satisfied with the piling disposition condition. The computer judges the input information, and if it is satisfactory proceeds to step 43, and if it is not, returns to the step 34.

Step 43: The computer, using the information of the final piling position and the piling direction obtained within the memory sections 14, determines the piling order of each cargo according to the predetermined priority rule, and sets the result in a predetermined column of the table of FIG. 9 prepared within the memory section 15 and indicating the cargo piling order. Then it proceeds to step 44.

Step 44: The computer, using the information of the final piling position and the piling order obtained in the memory sections 14 and 15, calculates, for each cargo, the coordinates of the already piled cargoes, and decides the operation sequence of the robot, which avoids collision with the cargoes, and sets the result in a predetermined column of the table of FIG. 10 which is prepared within the memory section 16 and indicates the robot operation sequence. Then it proceeds to step 45.

Step 45: The computer commands the terminal device 23 to output a hard copy of necessary displayed information such as the piling disposition condition diagram and piling order. This hard copy is used for monitoring the operation of the palletizing robot and for a description of piling contents. Then it proceeds to step 46.

Step 46: The computer commands to output the list of piling position, piling order and robot operation sequence stored in the memory sections 14, 15 and 16 to the auxiliary memory unit 24, and completes a series of control operations. The information in the auxiliary memory unit is used as operation teaching data for the palletizing robot.

In the embodiment described in the foregoing, when a color graphic is used as the display unit 22, the display which is easy to understand by the operator can be provided by coloring in different colors each cargo which is successively piled. Further, in order to improve the mounting efficiency as high as possible, the operator may be allowed to designate partial mounting space, and a program routine which calculates automatically an arrangement method for piling in the partial mounting space as many cargoes as possible may be added. Further, in order to reduce the planning time, a modifying function such as parallel movement, rotation and deletion of the cargoes may be added, and a function of retrieving a piling pattern in the past may be added.

As described above, according to the method of the present invention, for the request for piling, the piling disposition (piling pattern) can be decided in a short time with a simple manipulation, and by virtue of the piling pattern, the mounting efficiency on the pallet can be improved significantly. Further, according to the method of the invention, the piling order and the robot operation sequence can be decided automatically, and the man-hours for teaching the robot can be reduced.

Next, the second embodiment of the present invention will be described in detail.

Figure 1B:
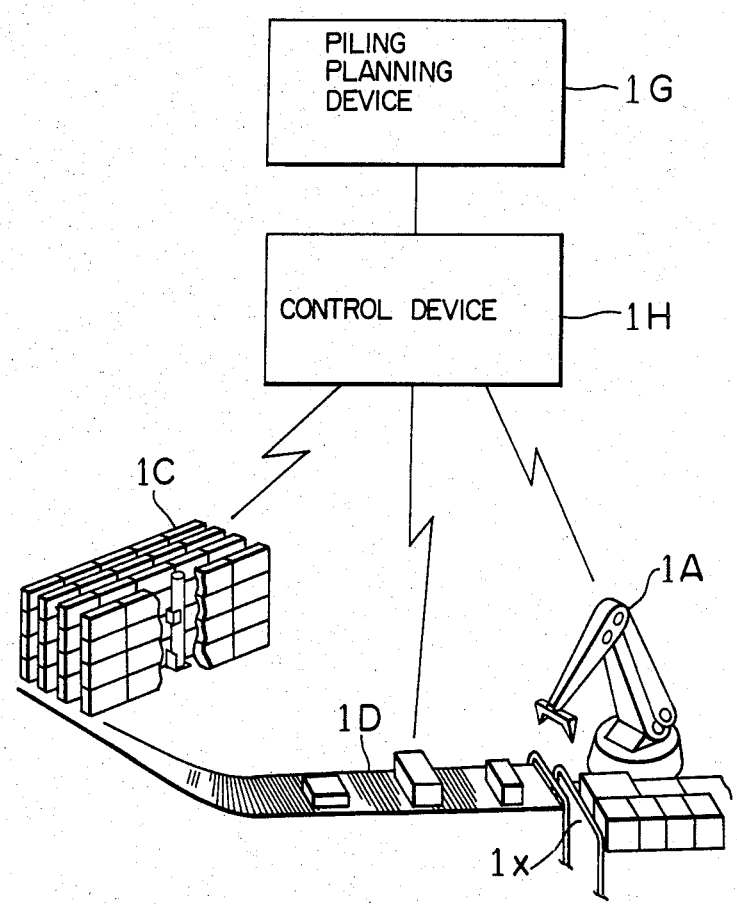
FIG. 1b is a schematic diagram, partially in block form, showing an arrangement of an automatic piling system according to the present invention.

FIG. 1b is a schematic diagram showing the arrangement of the automatic piling system for achieving the second object of the present invention.

The automatic piling system is comprised of a piling planning device 1G, a control device 1H, a marshalling device 1C, a supply device 1D and a piling device 1A. The piling planning device 1G, when a size of a cargo to be transported is given thereto, prepares a piling pattern, and at the same time prepares a piling order and an operation sequence of the piling device. Specifically, the piling planning device 1G is a computer inputted with data of the size of each cargo, and calculates the piling pattern, piling order and the operation sequence, and these results are displayed on a character display or a graphic display, and the piling planning data is prepared through the form of communication between the computer and the operator by inputting from a key board and the like.

The marshalling device 1C receives the cargoes to be transported in an arbitrary order and sends out the cargoes in a piling order, and specifically, the marshalling device 1C can be realized by an automatic warehouse, loop conveyor or the like in which the kind of each cargo and a rack number can be made in correspondence to each other, and designated cargoes can be sequentially supplied in accordance with the piling order.

The supply device 1D supplies the cargoes received from the marshalling device 1C to a piling station, and specifically, it can be realized by a conveyor or the like. The numeral 1X designates the piling station.

The piling device 1A piles the cargoes placed on the piling station 1X on the pallet in accordance with the designated operation sequence, and specifically, it can be realized by a robot or the like.

The control device 1H sends and receives signals to and from the four devices 1A, 1B, 1G and 1H, and performs general control of each of the devices, and specifically, it can be realized by a control computer or the like.

In the embodiment, it is supposed that the shapes of the cargoes are all rectangular parallelopiped and that each size is known.

FIG. 2 is a diagram showing a position of a cargo on a pallet.

In case of disposing a cargo 2B on a pallet 2A, for example, the rectangular coordinate system having the origin at the left end on the side of a robot (in FIG. 2, the robot is assumed to be located forward) is established to designate a piling position of the cargo. Specifically, the coordinates $P(x_i, y_i, Z_i)$ of a point 2C which is the nearest on the cargo 2B to the origin are defined as a piling position of the cargo 2B. Further, a direction of piling the cargo 2B is determined on the basis of whether the longer direction (displayed with a symbol L) of the cargo 2B is in the direction of the X axis or the shorter direction (displayed with a symbol S) is in the direction of the X axis.

FIG. 3 is a diagram showing an example in which a piling order has been determined.

In the figure, the piling order of each cargo in a plane is displayed, and the piling planning device 1A prepares the piling order in accordance with a predetermined rule, and displays the piling order. An example is shown in the figure, in which the cargoes are piled according to a priority rule, that is, as a rule, viewing from the side of the robot, the cargoes are piled (i) from bottom to top, (ii) from back to forward, and (iii) from left end to right end.

FIG. 4 is a diagram showing an example of an operation sequence.

The reference numeral 4F designates an operation point, and 4G designates an operation route, and the robot piles a cargo 4B to a position 4D along this route. In other words, in this case, the cargo 4B supplied on a supply conveyor 4A is piled on the position 4D over and across already piled cargoes 4E and 4C on a pallet 4X. If each piling position of the already piled cargoes can be identified as in this example, an optimum route can be determined to pass through while keeping off these cargoes as obstacles. Therefore, if a position of the already piled cargo is given in the coordinate system as shown in FIG. 2, an operation sequence of the robot can be determined.

Figure 5B:
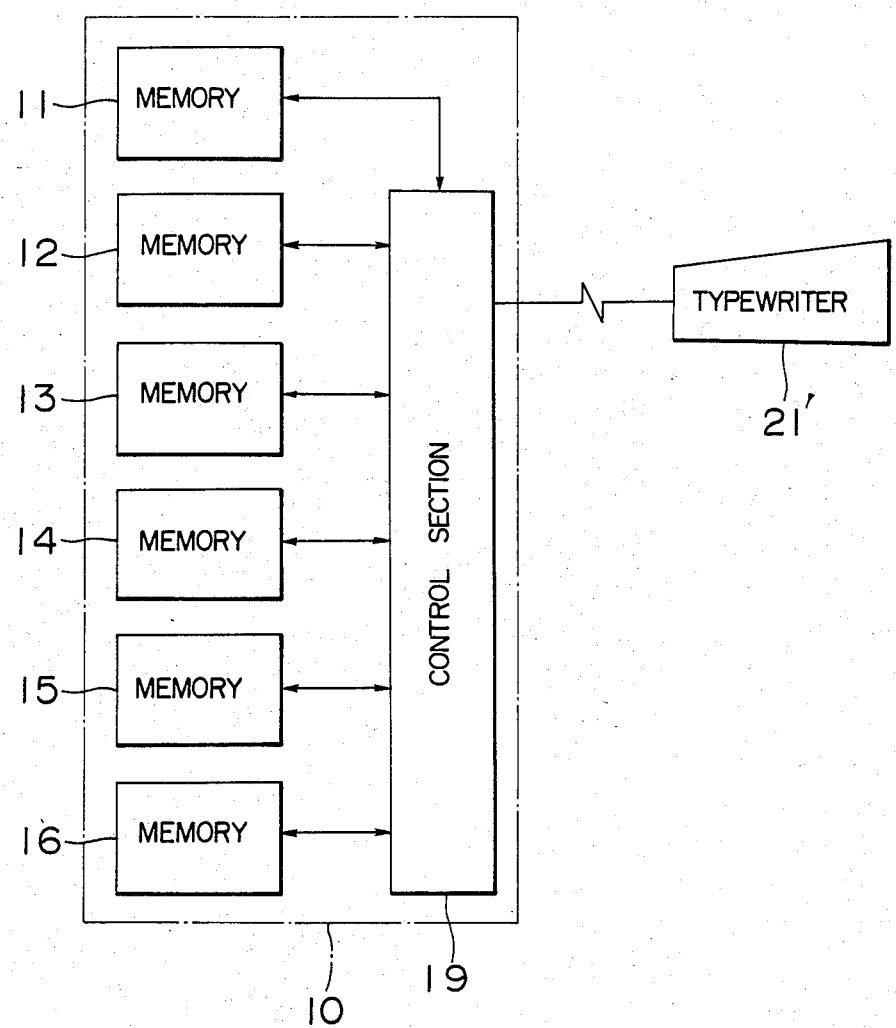
FIG. 5b is a block diagram showing an overall arrangement of the piling planning device in FIG. 1b.

FIG. 5b is a schematic block diagram showing an arrangement of the piling planning device 1G of FIG. 1b.

The piling planning device 1G is comprised of a computer 10 and a typewriter 21' for inputting data. The computer 10 includes memory sections 11 to 16 and a control section 19, and the control section 19 operates in accordance with a program stored in the memory section 11.

FIGS. 6 to 10 show various kinds of data stored respectively in memory sections within the piling planning device.

In the memory section 12 in FIG. 5b, for example as shown in FIG. 6, specification data for each pallet type which is registered beforehand is stored in the form of a table. In the memory section 13, for example as shown in FIG. 7, specification data and required piling quantity for each cargo which is inputted by the operator through the typewriter 21' are stored in the form of a table. In the memory section 14, for example as shown in FIG. 8, a piling pattern calculated by the computer 10 based on the data from the memory sections 12 and 13, that is, a cargo piling position and a piling direction are stored in the form of a table. In the memory sections 15 and 16, for example as shown in FIGS. 9 and 10, a cargo piling order and a robot operation sequence calculated by the computer based on the data from the memory sections 12, 13 and 14 are respectively stored in the form of a table.

In this respect, each data of the calculated piling pattern, piling order and operation sequence is stored as a plurality of sets of data, and a pattern name is stored for each pattern.

Figure 15:
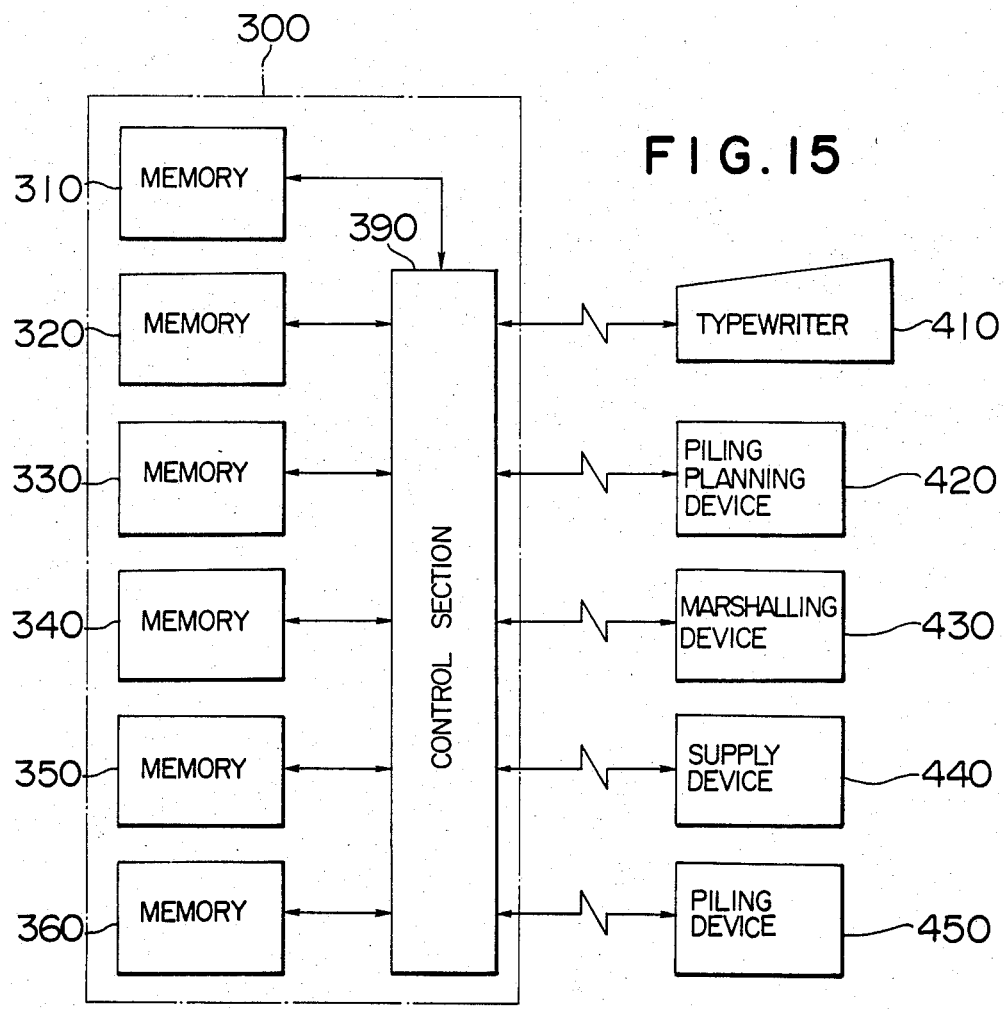
FIG. 15 is a block diagram of the control device 1H in FIG. 1b.

FIG. 15 is a schematic block diagram showing an arrangement of the control device 1H in FIG. 1b.

The control device 1H is comprised of a computer 300 and a typewriter 410. Further, the reference numeral 420 designates a piling planning device (1G), 430 a marshalling device (1C), 440 a supply device (1D), and 450 designates a piling device (1A). The typewriter 410 inputs the content of a piling work, that is, a piling pattern name and actuation information of the start of the piling work.

The computer 300 includes a control section 390 which operates in accordance with a program stored in the memory section 310, and includes five data memory sections 320 to 360.

FIGS. 16 to 20 show various kinds of data respectively stored in memory sections within the control device.

In the memory section 320 in the computer 300 in FIG. 15, for example as shown in FIG. 16, the content of a piling work inputted from the typewriter 410, that is, a work order, a piling pattern name and a work status are stored. The work status is the information inputted from the marshalling device 430.

In the memory section 330, for example as shown in FIG. 17, the piling order prepared in the piling planning device 420 is stored in a table form, and information of a piling status is stored by inputting a piling completed signal of each cargo sent from the piling device 450.

In the memory section 340, for example as shown in FIG. 18, the operation sequence of the robot prepared in the piling planning device 420 is stored in a table form, and further, information of an operation status is stored by inputting a completed signal of each operation for each cargo, sent from the piling device 450.

In the memory section 350, a cargo code of the cargo which has been warehoused in the marshalling device 430, and a rack number in the warehouse are inputted from the marshalling device 430 and registered beforehand, for example as shown in FIG. 19, and stored. Further, a stock status is updated by a warehouse-deliver signal inputted from the marshalling device 430 each time a cargo is warehoused or delivered, and the updated status is stored.

In the memory section 360, for example as shown in FIG. 20, information of a supply status inputted from the marshalling device 430 and supply device 440 is stored.

Referring to FIG. 5b, the operator, in order to prepare each piling planning data of a piling pattern of each cargo on the pallet, a piling order and a robot operation sequence by using the piling planning device before the piling work is commenced, selects a necessary type of pallet code among various pallets and inputs this data to the computer 10 through the typewriter 21'. Next, the operator inputs to the computer 10 from the typewriter 21' data of cargoes which the operator desires to pile on the pallet, that is, a cargo code, cargo specification and piling required quantity of each cargo. The computer 10 sets these data of the cargoes in a predetermined column of a table as shown in FIG. 7. Next, the computer 10 calculates a disposition (position and direction) of each cargo in the effective mounting space on the designated pallet, and this result, that is, data of the piling pattern is set in a predetermined column of a table as shown in FIG. 8. Then, the computer 10 calculates from each data of the piling pattern a piling order for piling each cargo on the pallet, and sets the piling order in a predetermined column of a table as shown in FIG. 9. Further, the computer 10 calculates from each data of the piling pattern and the piling order, an operation sequence of the robot and sets this data in a predetermined column of a table as shown in FIG. 10.

Figure 21:
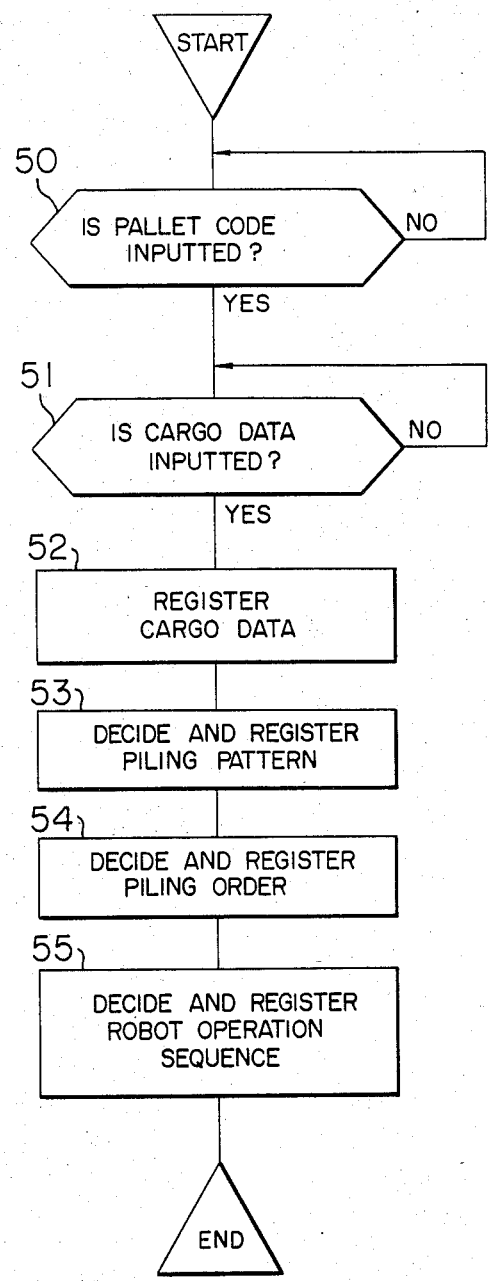
FIG. 21 is a flowchart of a control operation of the piling planning device 1G in FIG. 1b.

FIG. 21 is a program operation flowchart of the piling planning device in the present invention.

First, the computer 10 waits for an input of a pallet code, and when the operator inputs the pallet code from the typewriter 21', then proceeds to the next step (step 50). Next, the computer 10 waits for an input of cargo data, and when the operator inputs the cargo data, that is, a cargo code, cargo specification and required piling quantity from the typewriter 21', then proceeds to the next step (step 51). The computer 10 sets the inputted cargo data, that is, the cargo code, cargo specification and required piling quantity in a predetermined column of a table of FIG. 7 prepared within the memory section 13 (step 52). The computer 10, based on the pallet specification corresponding to the pallet code inputted in the step 50 and the cargo data inputted in the step 51, calculates a disposition and a direction of each cargo in the effective mounting space on the pallet, and sets the result as a piling pattern in a predetermined column of a table of FIG. 8 (step 53). The computer 10, based on the piling pattern calculated in the step 53, calculates a piling order to pile by the robot, and sets the result in a predetermined column of a table of FIG. 9 (step 54). The computer 10, based on the piling pattern calculated in the step 53 and the piling order calculated in the step 54, calculates an operation sequence of the robot, and sets the result in a predetermined column of a table of FIG. 10 (step 55).

In this manner, a pattern name is given to a set of the piling pattern, piling order and operation sequence calculated by the computer 10. For example, in FIGS. 8 to 10, a pattern A is stored. The operations described above are performed repeatedly, calculated, and stored as respectively different pattern names.

FIGS. 22a, 22b, 23 and 24 are respectively program operation flowcharts.

Figure 22A:
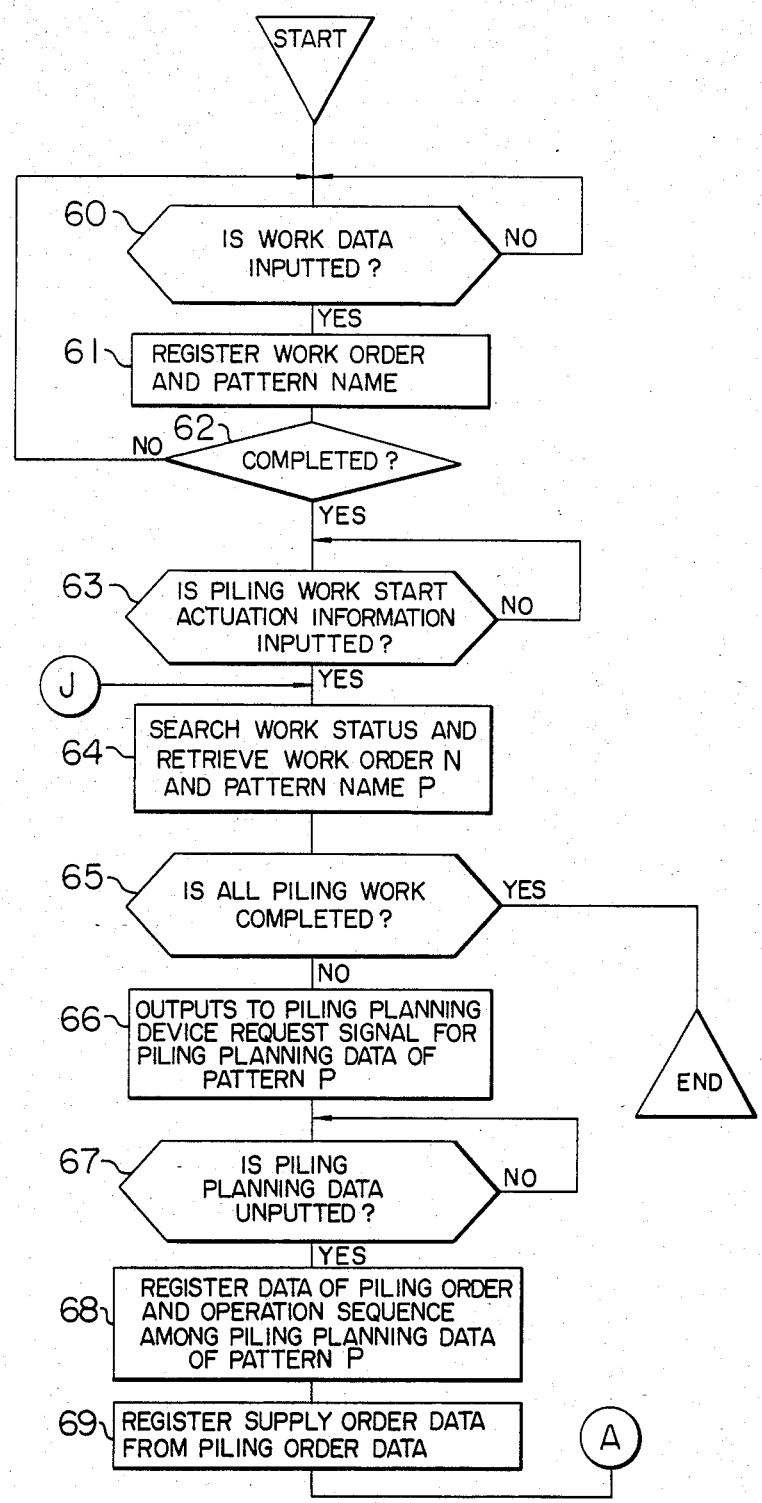
FIGS. 22a and 22b, 23 and 24 are flowcharts of control operations of the control device in FIG. 15.
Figure 22B:
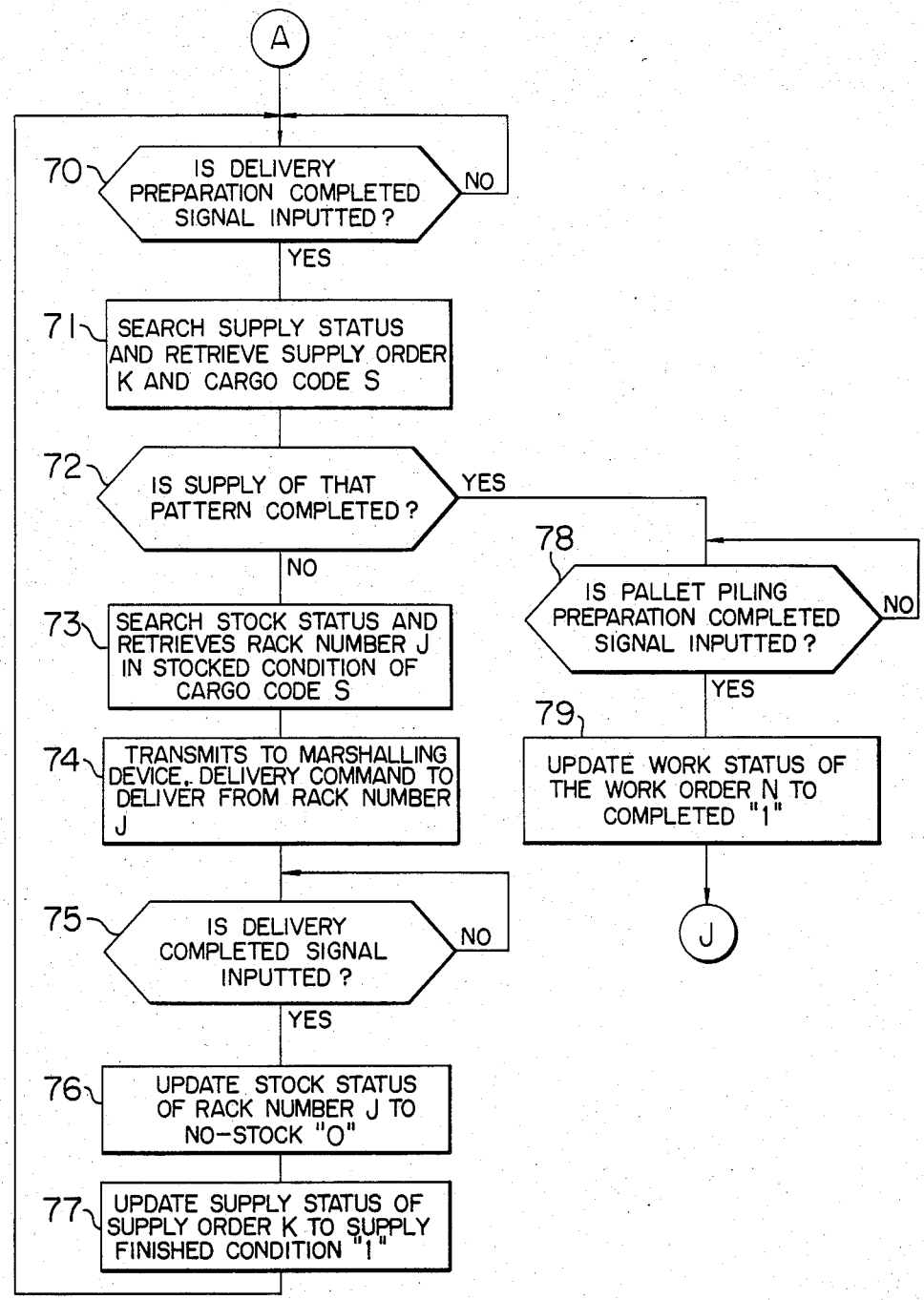

In these figures, the flowcharts of FIGS. 22a and 22b show concrete operations from the start of the piling work until the supply by the marshalling device.

In this case, it is assumed that before the start of the piling work, cargoes of each pattern required for the piling work have been warehoused in the marshalling device 430 in FIG. 15, and the data of the rack number and the cargo code have been set in the predetermined column in the memory section 360 of the control device. As a result, the operation of FIG. 22 commences at a time point when the operator actuates the start of the work.

First, the computer 300 waits for an input of the work data, and when the operator inputs a work order and a piling pattern name as the work data from the typewriter 410, upon completion of the inputting.

The computer proceeds to the next step (step 60). Thus, the computer 300 sets the inputted work order and the piling pattern name in a predetermined column of a table of FIG. 16 which is prepared in the memory section 320 and which indicates the work content (step 61). The computer 300 proceeds to the next step when the operator inputs data indicative of the completion of inputting of the work data. Further, if it is not, returns to the step 60 (step 62). The computer 300 waits for an input of piling start actuation information, and the operator checks the marshalling device 430, supply device 440 and piling device 450, and if they are in a workable condition, the operator inputs the information for the piling work start actuation. After completion of the inputting of the information, it proceeds to the next step (Step 63). The computer 360 searches the work status (refer to FIG. 16) set in the memory section 320, and retrieves the first work order N and a pattern name P among work incomplete (symbol "0") (step 64). If all piling works registered beforehand in the step 61 have been completed (all work status are completed "1"), the operation finishes. If it is not, it proceeds to a step 66 (step 65). The computer 300, in order to input, as piling data of the pattern name P retrieved in the step 64, the piling data calculated in the piling planning device 420 beforehand, that is, the piling pattern, piling order and operation sequence, outputs to the piling planning device 420 a request signal for piling planning data of the pattern P (step 66). The computer 300 waits for an input of the piling planning data (step 67). The piling planning device 420, in accordance with the operation steps 50 and 55 shown in FIG. 21, transmits to the computer 300, data of the piling order stored in the memory section 350 and data of the operation sequence stored in the memory section 360, among the piling planning data of that pattern P which has been prepared and stored beforehand. As a consequence, the computer 300 registers in predetermined columns, by expressing in a table form, respectively in the memory sections 330 and 340, the data of the piling order and the operation sequence among the piling planning data of that pattern P transmitted from the piling planning device 420 (step 68). In other words, the data of the piling order is set in the predetermined column in the memory section 330 as shown in FIG. 17, and at the same time the column of the piling status is set to zero-clear ("0"), that is, set to a condition of piling undecided. Also, the data of the operation sequence is set in the predetermined column in the memory section 340 as shown in FIG. 18, and the column of the operation status is set to zero-clear ("0"), that is, set to a condition of operation undecided. Next, the computer 300 sets the data of the piling order registered in the step 68 as it is, as the data of the supply order, in the predetermined column in the memory section 360 as shown in FIG. 20. At the same time, the column of the supply status is set to zero-clear ("0"), that is, set to a condition of unsupplied (step 69).

The computer 300 waits for an input of a delivery preparation completed signal (step 70). The marshalling device 420 transmits a delivery preparation completed signal to the computer 300 when the delivery of cargoes becomes possible. Thus, the computer 300 searches the supply status (refer to FIG. 20) set in the memory section 360 and retrieves a supply order K which is the first in the unsupplied status and a cargo code S (step 71). Next, the computer 300, when it is found in the search of the supply status (refer to FIG. 20) that the supply of all cargoes of that pattern P has been completed, proceeds to a step 78. On the other hand, when the supply of some cargoes is not completed and the cargoes remain, it proceeds to the next step (step 72). The computer 300 searches the stock status (refer to FIG. 19) set in the memory section 350, and retrieves a rack number J in a stocked condition "1" of the cargo code S retrieved in the step 71 (step 73). Next, transmits to the marshalling device 430 a delivery command signal to deliver a cargo of the rack number J retrieved in the step 73 (step 74). Next, the computer 300 waits for an input of a delivery completed signal (step 75). The marshalling device 430 receives the delivery command signal in the step 74, and delivers the cargo of the rack number J to the supply device 440. When the delivery is completed, the marshalling device 430 transmits a delivery completed signal to the computer 300.

In response to this signal, the computer 300 updates the stock status of the rack number J set in the memory section 350 to a no-stock condition "0", and sets the updated status (step 76). Next, it updates the supply status (refer to FIG. 20) of the supply order K set in the memory section 360 to a supply finished condition "1" and sets the updated status (step 77). Next, the computer 300 returns to the step 70.

In this case, in the step 72, when it is found that the supply of all the cargoes have been completed, the computer 300 waits for an input of a pallet piling preparation completed signal (step 78). The piling device 450 finishes the piling work of the work order N, and after setting a new vacant pallet, transmits the pallet piling preparation completed signal to the computer 300. Receiving this signal, the computer 300 updates the work status (refer to FIG. 16) of the work order N set in the memory section 320 to a work completed condition "1", and sets the updated status (step 79). And the computer 300 returns to the step 64 via J .

In this manner, the cargoes are sequentially delivered to the supply device 440 by the marshalling device 430 in accordance with the control operations in FIGS. 22a and 22b. Each cargo is sent out successively by the supply conveyor to the piling station just before the piling device 450.

Figure 23:
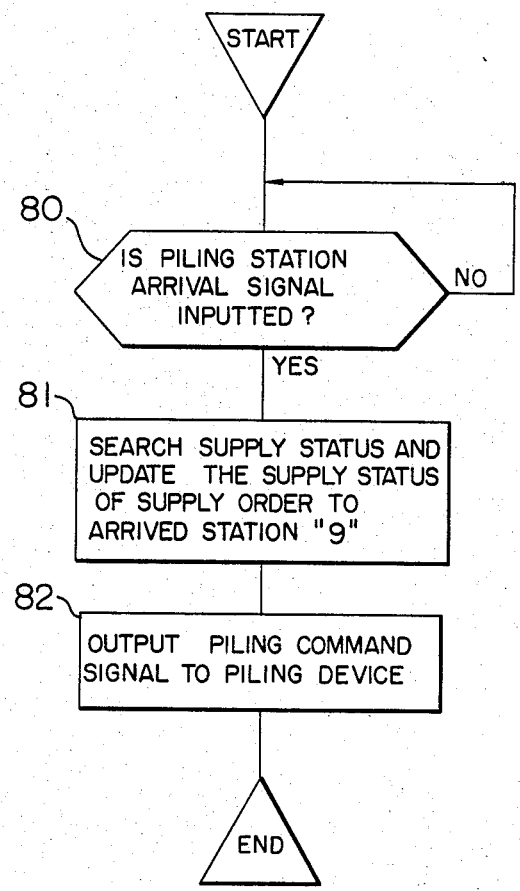

FIG. 23 is a flowchart showing concrete operations of the control device when the cargo arrives at the piling station.

The computer 300 waits for an input of a piling station arrival signal (step 80). When the cargo arrives at the piling station through the supply conveyor from the marshalling device 430, the piling station arrival signal is transmitted from the supply device 440 to the computer 300. By this signal, the computer 300 searches the supply status (refer to FIG. 20) set in the memory section 360 and updates the supply status of the first supply order i among the supply finished condition "1" to a condition "9" indicating that the cargo has already arrived at the station, and sets the updated status (step 81). Then, the computer 300 outputs a piling command signal to the piling device 450 in order to pile the cargo arrived in the step 81 on the pallet.

Figure 24:
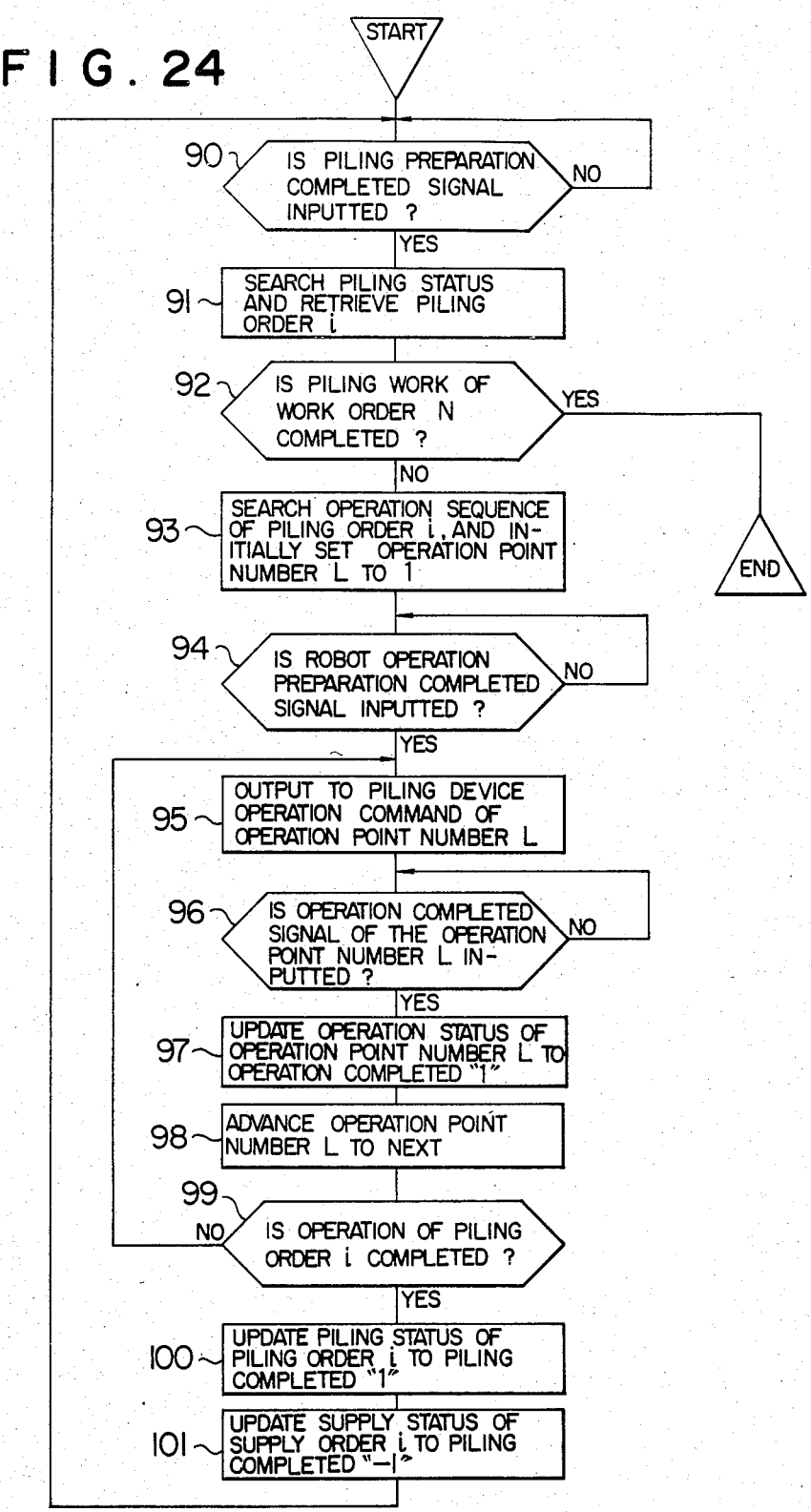

A flowchart of FIG. 24 shows a concrete operation to control the piling device 450 in order to pile the cargo arrived at the piling station in a decided position on the pallet.

First, the computer 300 waits for an input of a piling preparation completed signal (step 90). The piling device 450, when the piling command signal transmitted in the step 82 is inputted, transmits the piling preparation completed signal to the computer 300 upon completion of the piling of the cargo which is the earlier piling order than the cargo arrived at the piling station. Upon receiving this signal, the computer 300 searches the piling status (refer to FIG. 17) set in the memory section 330, and retrieves the first piling order i among the piling unfinished "0" (step 91). In the search of the piling status in the step 91, if all the piling status of the work order N is in the piling completed condition "1", the computer 300 finishes this operation. If it is not, that is, if any one of "0" is remaining, proceeds to a step 93 (step 92). The computer 300 searches the operation sequence (refer to FIG. 18) of the piling order i set in the memory section 340 and retrieved in the step 91, and initially sets an operation point number L to "1" (step 93). Next, the computer 300 waits for an input of a robot operation preparation completed signal (step 94). The piling device 450 completes the piling of the cargo of that piling order i, and when a position of the arm of the robot returns to a stand-by condition, transmits a robot operation completed signal to the computer 300. By this signal, the computer 300 transmits to the piling device 450 the data (refer to FIG. 18) of the operation sequence of that operation point number L set in the memory section 340, and also transmits an operation command signal (step 95). Next, the computer 300 waits for an input of an operation completed signal of that operation point number L (step 96). The piling device 450, when the operation of that operation point number commanded in the step 95 is completed, transmits the operation completed signal to the computer 300. By this signal, the computer 300 updates the operation status (refer to FIG. 18) of that operation point number L set in the memory section 340 to an operation completed condition "1", and sets the updated status (step 97). The computer 300 searches the operation sequence set in the memory section 340, and sets the next operation point number L (step 98). Next, in the search of the operation sequence in the step 98, when all the operation sequence of that piling order i is completed, it proceeds to the next step. If it is not, that is, if any one of the unfinished operations remains, it returns to the step 95 (step 99). The computer 300 searches the piling order (refer to FIG. 17) set in the memory section 330, and updates the piling status of that piling order i to a piling completed condition "1", and sets the updated status (step 100). Next, the computer 300 updates the supply status (refer to FIG. 20) set in the memory section 360 to a piling completed condition "−1", and sets the updated status (step 101).

In this manner, the operation returns again to the step 90, and the operation is repeated.

In this instance, in the embodiment of FIG. 5b, the typewriter 21' is used as a data input means of the piling planning device 1G of FIG. 1b, an axiliary memory medium such as a floppy disk or the like may be used, and further, the data may be inputted from other computers through a communication channel in an on-line basis. Further, in the embodiment, although separate computers 10 and 300 are used respectively for the piling planning device 1G and the control device 1H, the same computer may be used to operate on a time division basis. Further in the embodiment, the automatic warehouse is used as the marshalling device 1C, in order to improve the supply speed of the cargoes, a multi-stage type loop conveyor or a multi-stage type rotary rack formed by a plurality of loop conveyors or rotary racks lying one upon another may be used. Further, in order to improve the reliability, in the supply device 1D, an identifying device may be provided to identify by a bar code or the like the kind of the cargo delivered, and to stop the supply device 1D if abnormal delivery is found. Further, in the piling station of the supply device 1D, in order to improve the accuracy of positioning, a pusher or the like may be used to secure the piling position. Further, in FIG. 1b in the embodiment, the multi-joint type robot is used as the piling device 1A, however, a rectangular type robot or robots of other types may be used. Further, the pallet may be mounted on a conveyor or on a fixed station. Further, in the control operation of the control device 1H shown in FIGS. 22 to 24, for simplicily, it is presumed that until the piling work on one pallet finishes, the cargo which is to be piled on the next pallet is not supplied, and the cargo is made to stand by within the marshalling device. However, in order to increase the dealing speed of the piling work, it may be controlled so that even during the piling work on the previous pallet, the supply of the cargo for the next pallet is commenced in advance.

In the embodiment of FIG. 5a, it is arranged that the computer 10 calculates the piling pattern based on the data from the memory section 12 (data of pallet specification) and the memory section 13 (data of cargo specification and required piling quantity). However, by graphically displaying the piling condition on a graphic display unit, the piling pattern may be determined step by step in the form of communication between the operator and the computer.

As discribed in the foregoing, according to the system of the present invention, for an arbitrary cargo piling request, the disposition of piling (piling pattern) is determined beforehand, and a piling order and an operation sequence of the piling device are automatically decided, and then the cargoes are automatically supplied to the piling device in accordance with the given order. Therefore, even in such a case where cargoes of different sizes are to be piled, the mounting efficiency on the pallet can be improved significantly, and at the same time the man-hours for teaching the piling device, and the man-hours for supplying the cargoes arrived in an arbitrary order can be reduced.

We claim:

1. A piling planning method for a palletizing robot for determining a cargo piling disposition on a pallet, a cargo piling order and a robot operation sequence to operate said palletizing robot to automatically pile cargoes of various sizes on said pallet by said robot, comprising storing in a memory means a pallet specification, a cargo specification, a cargo piling position, a cargo piling order and a robot operation sequence; calculating piling planning information using a computer; inputting to said computer command information for piling the cargoes on said pallet; displaying on a display terminal device a condition of piling disposition of the cargoes on said pallet outputted from said computer; producing documentation of a final condition of the cargo piling disposition and a final cargo piling order outputted from said computer; graphically displaying the condition of the cargo piling disposition on the pallet corresponding to said input information on said display terminal device thereby to determine the cargo piling disposition by a form of communication between an operator and said computer; and simultaneously obtaining the cargo piling order and the robot operation sequence required for the operation of said robot from said final cargo piling disposition.

2. A piling system for cargoes using a palletizing robot comprising, piling planning means for preparing a piling disposition of cargoes on a pallet, a piling order and a sequence of piling operations in response to data as to various sizes of the plurality of cargoes to be transported, control means receiving data from said piling planning means for controlling a piling operation in accordance with said data, marshalling means receiving said cargoes in an arbitrary order for sending out said cargoes in accordance with the piling order from said control means, supply means for supplying said cargoes from said marshalling means to certain positions on said pallet, and piling means for piling said supplied cargoes on said pallet in accordance with said operation sequence.

3. A piling system according to claim 2, wherein said piling planning means includes a data storage table for storing data for each pallet inputted before the start of the piling work, data of the cargoes to be transported, a disposition of each cargo on a predetermined pallet prepared from these data, a piling order of each cargo, and an operation sequence of said piling means.

4. A piling system according to claim 2, wherein said control means includes a first memory means for storing a work order and a piling pattern name inputted externally, and information of a work status inputted from said marshalling means, a second memory means for storing a piling order from said piling planning means and information of a piling status provided by a signal from said piling means, a third memory means for storing an operation sequence from said piling planning means and information of an operation status provided by a signal from said piling means, a fourth memory means for storing warehousing information of the cargo from said marshalling means and a stock status, and a fifth memory means for storing information of a supply status from said marshalling means and said supply means.

* * * * *